United States Patent
Lee et al.

(10) Patent No.: US 8,259,776 B2
(45) Date of Patent: Sep. 4, 2012

(54) STBC BASED TRANSMISSION METHOD CONSIDERING NUMBER OF SYMBOLS IN SLOT

(75) Inventors: Dae Won Lee, Anyang-si (KR); Yu Jin Noh, Anyang-si (KR); Bong Hoe Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 473 days.

(21) Appl. No.: 12/585,649

(22) Filed: Sep. 21, 2009

(65) Prior Publication Data

US 2010/0074305 A1 Mar. 25, 2010

Related U.S. Application Data

(60) Provisional application No. 61/098,791, filed on Sep. 21, 2008.

(30) Foreign Application Priority Data

Dec. 23, 2008 (KR) ........................ 10-2008-0132440

(51) Int. Cl.
*H04B 1/00* (2006.01)
(52) U.S. Cl. ....................................................... 375/135
(58) Field of Classification Search .................. 375/135, 375/130, 295, 299; 370/208, 345
See application file for complete search history.

(56) References Cited

U.S. PATENT DOCUMENTS

| | | | |
|---|---|---|---|
| 2007/0053282 A1* | 3/2007 | Tong et al. | 370/208 |
| 2007/0183527 A1* | 8/2007 | Jia et al. | 375/267 |
| 2007/0189151 A1 | 8/2007 | Pan et al. | |
| 2007/0291638 A1 | 12/2007 | Chae et al. | |
| 2008/0080594 A1* | 4/2008 | Naguib | 375/144 |

FOREIGN PATENT DOCUMENTS

WO  WO 2008/098093  8/2008

OTHER PUBLICATIONS

C. Ciochina, et al. "Single Carrier Space-Frequency Block Coding: Performance Evaluation" In: Proceedings of 2007 IEEE 66th Conference on Vehicular Technology, Sep. 2007, pp. 715-719.

* cited by examiner

*Primary Examiner* — Khai Tran
(74) *Attorney, Agent, or Firm* — McKenna Long & Aldridge LLP

(57) ABSTRACT

An STBC based signal transmission method considering the number of symbols within a slot. In transmitting a signal using two or more transmission antennas in a mobile communication system using a structure in which one subframe includes two slots and each slot includes a plurality of symbols, transmission symbols are paired in units of two consecutive symbols within each subframe by an STBC scheme. The transmission symbols are mapped to a frequency region in units of slots and the mapped transmission symbols are transmitted. One symbol within a slot in which the number of symbols excluding symbols for transmitting a reference signal is an odd number is not paired by the STBC scheme.

9 Claims, 17 Drawing Sheets

STBC BASED TRANSMISSION METHOD CONSIDERING NUMBER OF SYMBOLS IN SLOT

CROSS REFERENCE TO RELATED APPLICATIONS

This application claims the benefit of U.S. Provisional Application No. 61/098,791, filed on Sep. 21, 2008, which is hereby incorporated by reference as if fully set forth herein.

This application claims the benefit of Korean Patent Application No. 10-2008-0132440, filed on Dec. 23, 2008, which is hereby incorporated by reference as if fully set forth herein.

BACKGROUND OF THE INVENTION

1. Field of the Invention

The present invention relates to a technique for applying space-time block coding (STBC) in consideration of the number of symbols within a slot in a wireless communication system, and a signal transmission method using the same.

2. Discussion of the Related Art

A peak-to-average power ratio (PAPR) is associated with a dynamic range which should be supported by a power amplifier in a transmitting side. A cubic metric (CM) is another value which can express a value indicated by PAPR.

Generally, a single carrier signal exhibits better performance than a multi-carrier signal in CM or PAPR. A $3^{rd}$ generation partnership project (3GPP) long-term evolution (LTE) system uses single carrier frequency division multiple access (SC-FDMA) so that uplink transmission from a user equipment (UE) to a Node B (or eNB) may have a single carrier characteristic due to PAPR/CM problems. In a 3GPP long term evolution-advanced (LTE-A) system, a multiple input multiple output (MIMO) transmission scheme using the SC-FDMA has been discussed to maintain a good CM characteristic.

Hereinafter, the MIMO transmission scheme will be described in brief.

MIMO refers to a method capable of improving transmission/reception data efficiency using multiple transmit antennas and multiple receive antennas, instead of a conventional method employing one transmit antenna and one receive antenna. That is, MIMO is an application of technology that gathers fragmentary data pieces received from multiple antennas into one and constructs data, without depending upon a single antenna path to receive one whole message. The MIMO technology can improve a data transmission rate within a specific range or can increase a system range with respect to a specific data transmission rate. The MIMO technology is a next-generation mobile communication technology which can be widely used in mobile communication terminals, repeaters, etc.

FIG. 1 illustrates the construction of a general MIMO system.

If the number of antennas is simultaneously increased in both a transmitting side and a receiving side, since theoretical channel transmission capacity is increased in proportion to the number of antennas, unlike the case in which multiple antennas are used in either the transmitting side or the receiving side, frequency efficiency can be remarkably improved.

In a trend in research up to now related to multiple antenna technologies, active studies have been conducted in many aspects, including research into information theory related to the capacity computation of multiple antenna communication in various channel environments and in multiple access environments, research into wireless channel measurement and introduction of MIMO systems, and research into space-time signal processing technologies for improving transmission reliability and a transmission rate.

MIMO technology includes a 'spatial diversity' scheme for increasing transmission reliability using symbols passing through various channel paths and a 'spatial multiplexing' scheme for improving a transmission rate by simultaneously transmitting a plurality of data symbols using a plurality of transmit antennas. Recently, studies on a method of combining the above-described schemes to take advantage of the respective schemes have been carried out.

A description of the aforementioned schemes will now be given in detail.

First, the spatial diversity scheme includes a space-time block coding method, and a space-time trellis coding method using both a diversity gain and a coding gain. The trellis coding is generally excellent in terms of improvement of a bit error rate and the degree of freedom in generating codes but the space-time block coding method is simple in terms of computation. The space diversity gain can be obtained from a multiplication of the number of transmit antennas and the number of receive antennas. Meanwhile, a 'space-time coding method' may be regarded as a 'space-frequency coding method' when considering a frequency region instead of time and the same coding scheme is applied to both cases.

Second, the spatial multiplexing scheme transmits different data sequences through respective transmit antennas. At this time, in a receiver, mutual interference may be generated between data which is simultaneously transmitted from a transmitter. Then the receiver eliminates the interference using proper signal processing methods and receives the data. The receiver used for eliminating the interference includes a maximum likelihood receiver, a zero forcing (ZF) receiver, a minimum mean square error (MMSE) receiver, a diagonal Bell laboratories layered space-time (D-BLAST) receiver, and a vertical Bell laboratories layered space-time (V-BLAST) receiver. Especially, if the transmitter is aware of channel information, a singular value decomposition (SVD) method may be used to eliminate the interference.

Third, a combination of the spatial diversity scheme and the spatial multiplexing scheme may be used. If only the spatial diversity gain is obtained, a gain in performance improvement caused by an increase in a diversity order is gradually saturated. If only the spatial multiplexing gain is obtained, the transmission reliability of a wireless channel is decreased. Accordingly, studies into a method for solving theses shortcomings and simultaneously obtaining the spatial diversity gain and the spatial multiplexing gain have been conducted. As a result, double space-time transmit diversity (double-STTD), and space-time bit interleaved coded modulation (STBICM) have been used.

In the above-described MIMO system, transmission efficiency may be increased by multiplying a weight to a transmission signal through each antenna. Multiplexing a weight to a transmission signal is called precoding.

When using general precoding, since information signals corresponding to multiple layers are multiplexed and transmitted in terms of one antenna, a transmission signal may be regarded as a kind of a multicarrier signal. Namely, deterioration of CM characteristics of the transmission signal may occur through precoding.

When considering the reason why the CM characteristics are lowered by precoding, if multiple single carrier signals having good CM characteristics are simultaneously overlapped, it may be appreciated that the CM characteristics are deteriorated. Therefore, if information generated from multiple layers in an SC-FDMA system is mapped to single carrier signals of a number as small as possible and multiplexed and transmitted through one physical antenna, good CM may be maintained.

Meanwhile, in a transmit diversity technique of the above MIMO scheme, special processing is performed with respect to information during transmission. Accordingly, a receiving side may ensure reliability to some degree through the transmit diversity even though a part of a channel is in a bad environment. The transmit diversity is generally used when a UE is at a cell edge and may be used in environments in which channel-dependent scheduling is difficult due to rapid variation of a channel or a channel is abruptly varied. In addition, there are various environments and conditions in which the transmit diversity scheme can be used.

SUMMARY OF THE INVENTION

Accordingly, the present invention is directed to an STBC based signal transmission method considering the number of symbols within a slot, which substantially obviates one or more problems due to limitations and disadvantages of the related art.

An object of the present invention is to provide various methods which can achieve transmit diversity while maintaining good CM characteristics.

Another object of the present invention is to provide a method for achieving transmit diversity using an STBC scheme and efficiently applying STBC in consideration of the number of symbols within each subframe/slot in an SC-FDMA system.

Another object of the present invention is to provide a method for maintaining good CM characteristics by applying STBC to respective symbols and efficiently mapping the symbols to a subcarrier in a four-antenna system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method is provided for transmitting a signal using two or more transmission antennas in a mobile communication system using a structure in which one subframe includes two slots and each slot includes a plurality of symbols. The method includes pairing transmission symbols in units of two consecutive symbols within each subframe by an STBC scheme, and mapping the transmission symbols to a frequency region in units of slots and transmitting the mapped transmission symbols, wherein one symbol within a slot in which the number of symbols excluding symbols for transmitting a reference signal is an odd number is not paired by the STBC scheme.

If the transmission symbols are transmitted through the one symbol which is not paired by the STBC scheme, a specific symbol may be transmitted through a first antenna and a symbol in a conjugate form of the specific symbol may be transmitted through a second antenna. Alternatively, the same symbol may be transmitted through first and second antennas.

The mapping of the transmission symbols to the frequency region may include performing frequency hopping in units of slots.

When the mobile communication system transmits a signal using an extended cyclic prefix of a $3^{rd}$ generation partnership project (GPP) series system, each slot may include 6 symbols and one symbol per slot may be previously assigned for transmission of a first type reference signal.

The method may further include additionally transmitting a second type reference signal through one symbol within a specific slot, wherein the second type reference signal is transmitted through a symbol corresponding to one symbol, which is not paired by the STBC scheme in a slot excluding the specific slot, among symbols within the specific slot.

The one symbol transmitting the second type reference signal may be located between symbols transmitting the first type reference signal.

In another aspect of the present invention, a method is provided for transmitting a signal using two or more transmission antennas in a mobile communication system using a structure in which one subframe includes two slots and each slot includes 6 symbols. The method includes pairing transmission symbols mapped to 4 symbols excluding one symbol for transmitting a data modulation reference signal within a first type slot in which a sounding reference signal is transmitted through one symbol, in units of two consecutive symbols by a spatial time block coding (STBC) scheme, pairing 4 symbols among transmission symbols mapped to 5 symbols excluding one symbol for transmitting the data modulation reference signal within a second type slot in which the sounding reference signal is not transmitted, in units of two consecutive symbols by the STBC scheme, and mapping the transmission symbols to a frequency region in units of slots and transmitting the mapped transmission symbols.

One specific subframe may include the first type slot and the second type slot, and transmission symbols which are not paired by the STBC scheme within the second type slot may be located between symbols for transmitting the data modulation reference signal within the subframe.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, various methods which can achieve transmission diversity while maintaining good CM characteristics are proposed.

In an exemplary embodiment of the present invention, a method for efficiently applying space-time block coding (STBC) in an SC-FDMA system will be described. To this end, an STBC scheme, more essentially, a transmission method using Alamouti code will now be explained.

Figure 1:
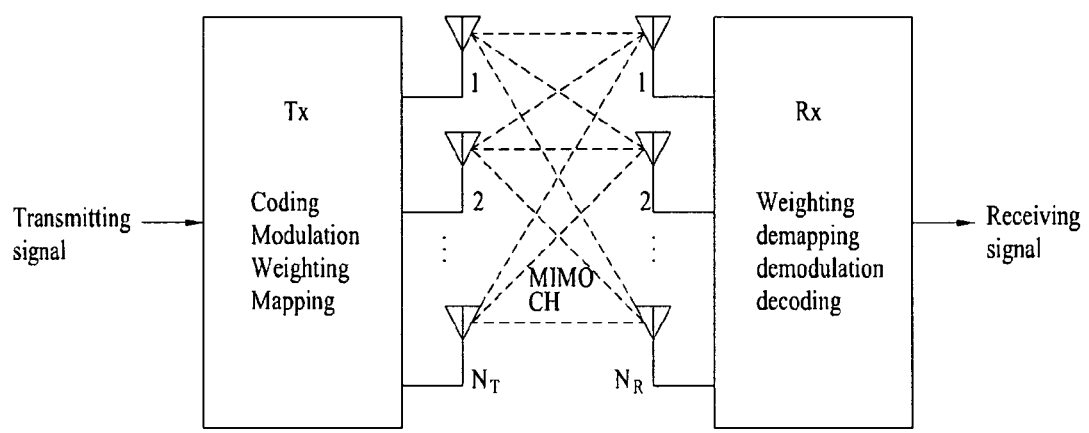
FIG. 1 illustrates the construction of a general MIMO system.
Figure 2:
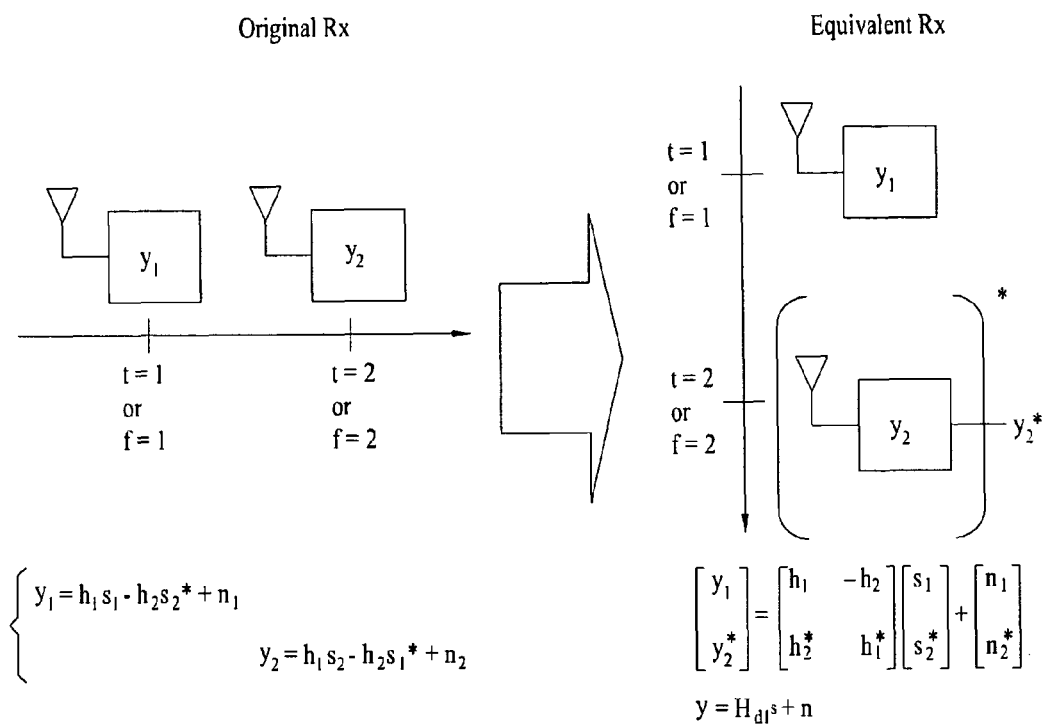
FIG. 2 illustrates the structure of an equivalent receiver easily explaining a system using Alamouti code.

A receiver in a transmit (Tx) diversity structure using Alamouti code may be changed to an equivalent receiver, as illustrated in FIG. 2, for more easy understanding.

FIG. 2 illustrates the structure of an equivalent receiver for easily explaining a system using Alamouti code.

In a Tx diversity scheme using Alamouti code, more efficient mathematical modeling of a received signal is possible when taking the complex conjugate of a second received signal. FIG. 2 represents that a received signal may be expressed as a matrix by taking complex conjugate with respect to a receiver corresponding to time 2 or frequency 2. Detailed mathematical modeling using the matrix will be described hereinbelow.

A matrix of Alamouti code may consider the following two cases.

$$\begin{bmatrix} s_1 & -s_2^* \\ s_2 & s_1^* \end{bmatrix} \quad \text{[Equation 1]}$$

$$\begin{bmatrix} s_1 & s_2 \\ -s_2^* & s_1^* \end{bmatrix} \quad \text{[Equation 2]}$$

In Equation 1 and Equation 2, each column of the matrices denotes a time or frequency and each row of the matrices denotes an antenna. In more detail, the matrix of Equation 1 is a general equation first proposed by Alamouti in his thesis and the matrix of Equation 2 is used in the 3GPP LTE standard. Namely, Equation 2 indicates a matrix reconstructed such that a signal transmitted through an antenna in a single-input single-output (SISO) scheme using only one antenna and a signal transmitted through a first antenna in an Alamouti scheme may be the same.

In the above equations, if each column of the matrices denotes a time, Alamouti code is used as one type of an STBC. If each column of the matrices denotes a frequency, the Alamouti code is used as one type of a space-frequency block code (SFBC).

A detailed description will now be given with reference to FIG. 2.

Typically, a received signal when Alamouti Tx diversity is used may be expressed by Equation 3. Although a description is given of STBC in which columns of the matrices shown in Equation 1 and Equation 2 denote times, the same mathematical modeling may be applied to SFBC in which columns of the matrices shown in Equation 1 and Equation 2 denote frequencies. Signals y1 and y2 at time 1 and time 2 may be expressed as follows.

$$\begin{cases} y_1 = h_1 s_1 + h_2 s_2 + n_1 \\ y_2 = -h_1 s_2^* + h_2 s_1^* + n_2 \end{cases} \quad \text{[Equation 3]}$$

In Equation 3, $n_1$ and $n_2$ denote noise generated in receive antennas, $s_1$ and $s_2$ denote transmission signals at time 1 and time 2, and $h_1$ and $h_2$ denote transmission channel values of antennas.

As illustrated in FIG. 2, when taking the complex conjugate of the received signal at time 2, the following equations are obtained.

$$\begin{cases} y_1 = h_1 s_1 + h_2 s_2 + n_1 \\ y_2^* = -h_1^* s_2 + h_2^* s_1 + n_2 \end{cases} \quad \text{[Equation 4]}$$

A received signal model as indicated in Equation 4 may be expressed as a vector and a matrix.

$$\begin{bmatrix} y_1 \\ y_2^* \end{bmatrix} = \begin{bmatrix} h_1 & h_2 \\ h_2^* & -h_1^* \end{bmatrix} \begin{bmatrix} s_1 \\ s_2 \end{bmatrix} + \begin{bmatrix} n_1 \\ n_2 \end{bmatrix} \quad \text{[Equation 5]}$$

$$y = H_{\text{eff}} s + n \quad \text{[Equation 6]}$$

where Heff denotes an effective channel.

In a MIMO system, a transmission signal may obtain a diversity gain through the above-described STBC. Although pairing is demanded in units of two transmission symbols per transmission unit in a time domain in order to apply the above-described STBC, it may be difficult to identically apply STBC because the number of symbols transmitted every time domain transmission unit may be an odd number in some cases.

Hereinafter, the structure of a transmission unit in an SC-FDMA system will be described.

Figure 3:
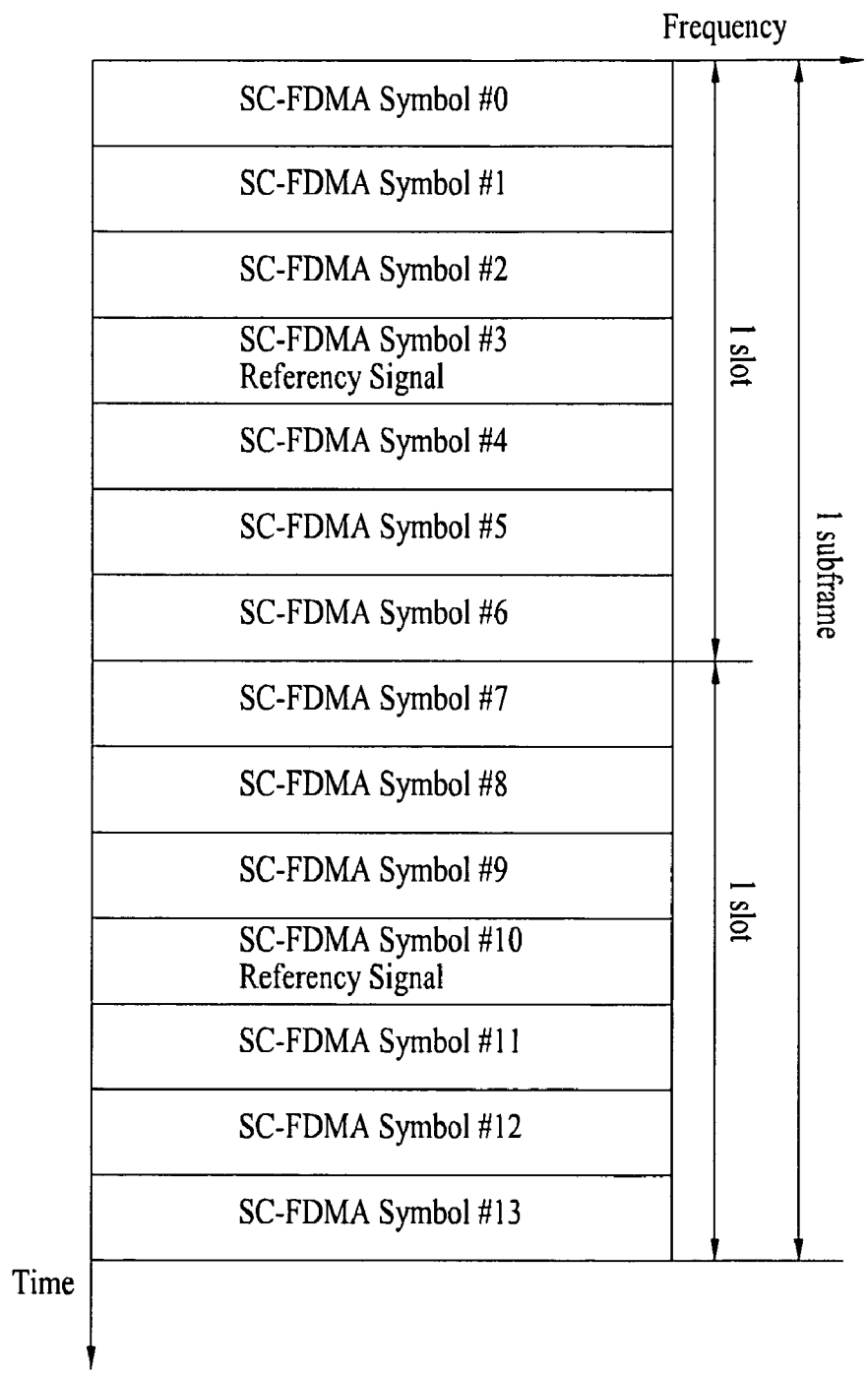
FIG. 3 illustrates the structure one subframe in an SC-FDMA system.

FIG. 3 illustrates the structure one subframe in an SC-FDMA system.

Specifically, FIG. 3 illustrates the structure of one subframe in a mode using a normal cyclic prefix (CP). One subframe is comprised of two slots. When using the normal CP as illustrated in FIG. 3, one subframe is comprised of 14 SC-FDMA symbols, i.e., 7 SC-FDMA symbols per slot.

Meanwhile, when using an extended CP, one subframe is comprised of 12 SC-FDMA symbols, i.e., 6 SC-FDMA symbols per slot.

For both cases using the normal CP and the extended CP, one SC-FDMA symbol among SC-FDMA symbols included in each slot is used to transmit a reference signal (RS). The RS may be referred to as data modulation reference signal (DMRS) to distinguish the RS from a sounding reference signal (SRS) which will be described later on. The first symbol or the last symbol may not be used according to circumstances.

Figure 4:
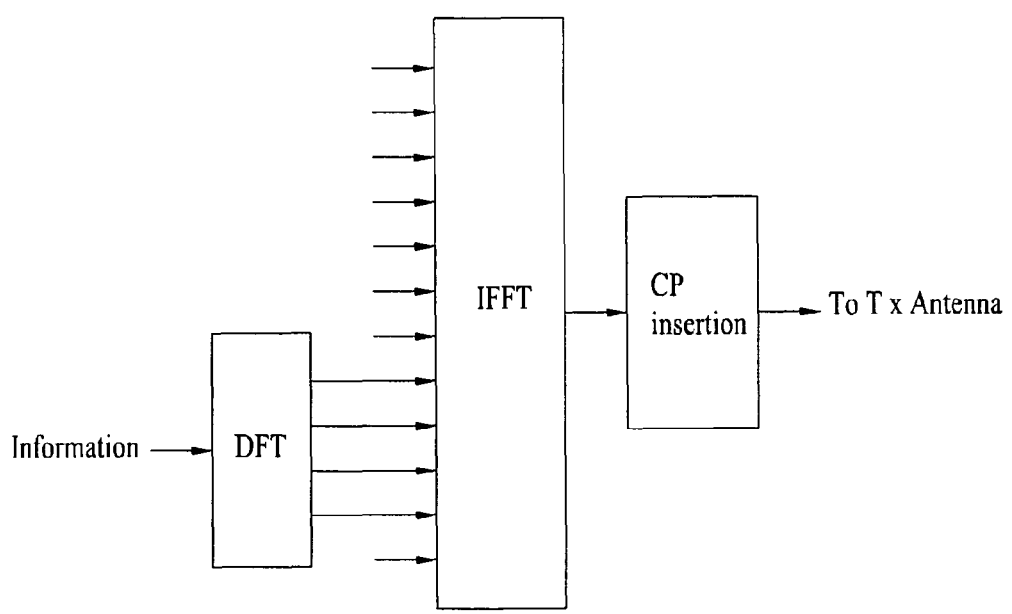
FIG. 4 illustrates the structure of a transmission side transmitting signals by an SC-FDMA scheme.

FIG. 4 illustrates the structure of a transmitting side transmitting signals by an SC-FDMA scheme.

As illustrated in FIG. 4, SC-FDMA information is mapped to a frequency region through discrete Fourier transform (DFT). Inverse fast Fourier transform (IFFT) is performed upon the information mapped to the frequency region and a CP is inserted into the IFFT information, thereby generating one SC-FDMA symbol. Performing DFT upon the information precedes performing IFFT because an effect may be obtained as if information is transmitted as a single carrier by offsetting an influence of the DFT and IFFT.

Since a signal transmitted as a single carrier signal has a small CM value, a maximum transmission power which can transmit a signal without distorting the signal in a power amplifier may be increased.

A method for transmitting signals by applying STBC according to an exemplary embodiment of the present invention will be described using the SC-FDMA subframe structure and SC-FDMA transmission scheme. First, a signal transmission method in a two-antenna system will be described.

In an embodiment, when applying STBC to the SC-FDMA system, the use of Alamouti code in a time axis is proposed to maintain a low CM value.

Figure 5:
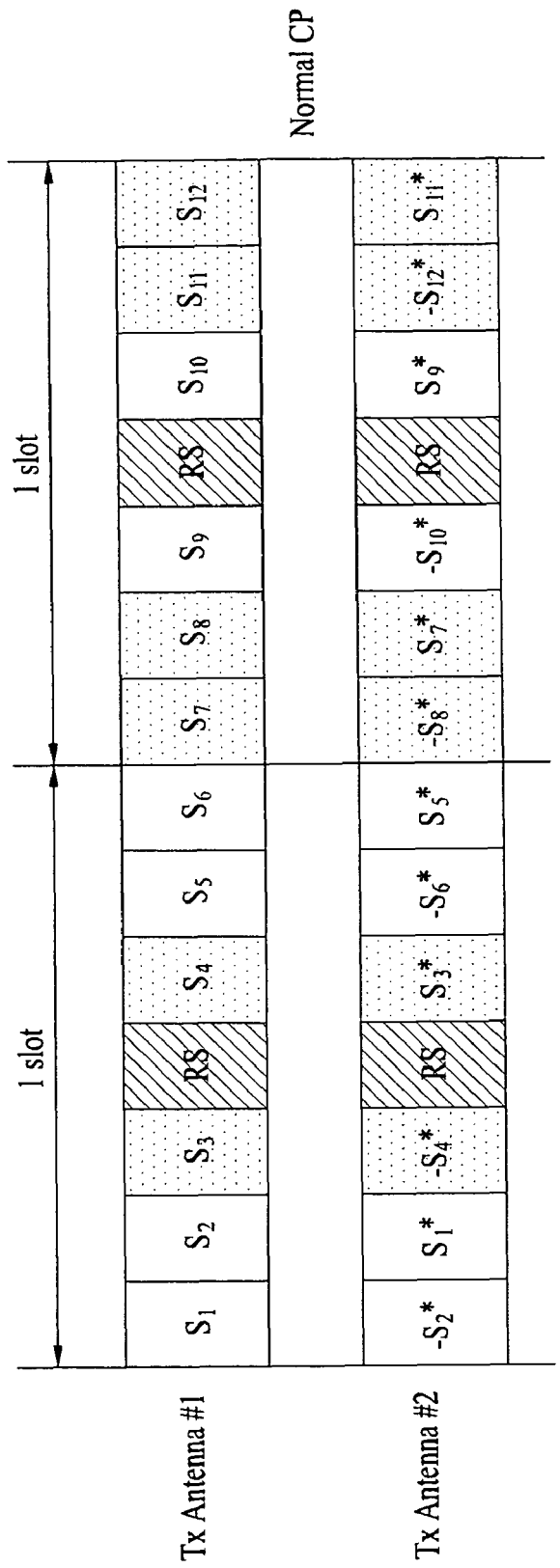
FIG. 5 illustrates a signal transmission method using a normal CP mode in a two-antenna system.

FIG. 5 illustrates a signal transmission method using a normal CP mode in a two-antenna system.

According to this embodiment, if a symbol mapped to a specific subcarrier is indicated by $S_x$ (where x=1, 2, 3, . . . , 12) when two Tx antennas are used, the signal transmission method as illustrated in FIG. 5 is proposed.

In a system using a normal CP, 7 SC-FDMA symbols are present per slot and one symbol per slot is used to transmit an RS. Accordingly, it is proposed that 6 symbols, excluding one symbol used to transmit the RS, be transmitted by pairing two symbols by two symbols by an STBC scheme.

However, if an SRS is additionally transmitted in addition to the RS signal, i.e., a DMRS, the number of symbols within a subframe may differ.

Figure 6:
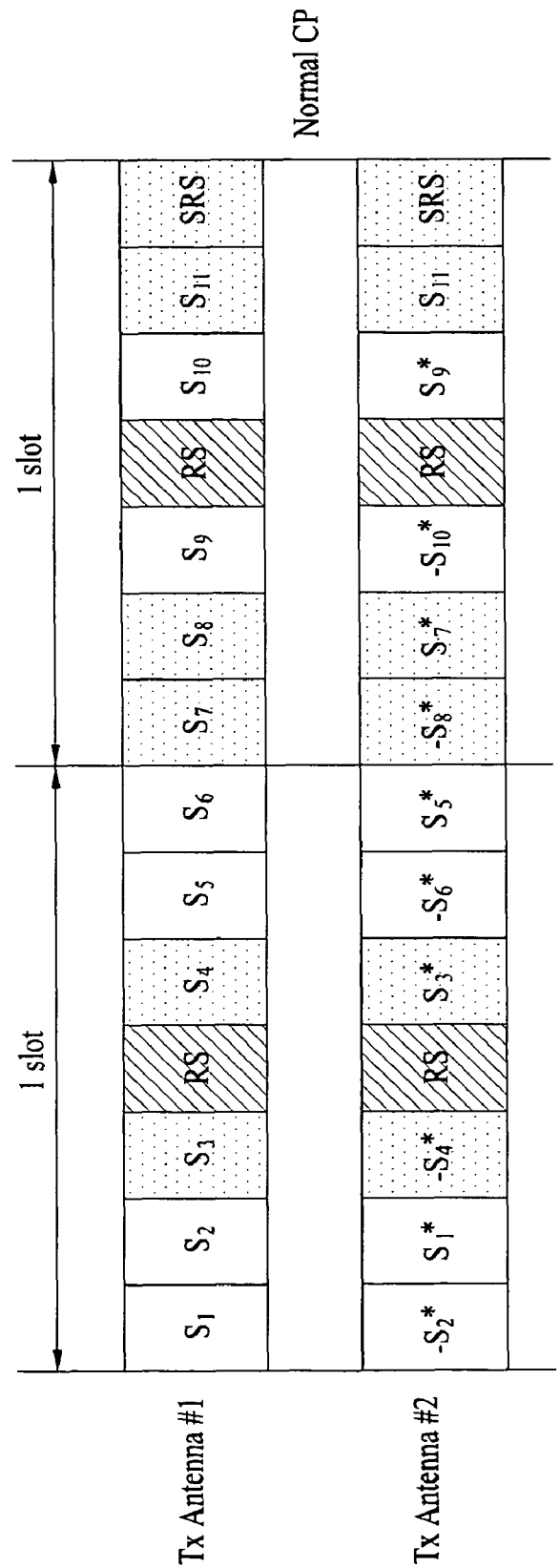
FIG. 6 illustrates a signal transmission method when an SRS is transmitted through a specific symbol within a subframe.

FIG. 6 illustrates a signal transmission method when an SRS is transmitted through a specific symbol within a subframe.

As illustrated in FIG. 6, when an SRS is additionally transmitted through one symbol within a subframe, the second slot includes odd-numbered symbols. In an exemplary embodiment of the present invention, 6 symbols excluding a symbol through which an RS is transmitted in the first slot are paired in units of two adjacent symbols by an STBC scheme. In the second slot, 4 symbols among 5 symbols, excluding two symbols through which an RS and an SRS are transmitted, are paired in units of two adjacent symbols by the STBC scheme, and pairing is not performed upon the last one remaining symbol.

In FIG. 6, a symbol $S_{11}$ is not paired by the STBC scheme. Specifically, the symbol $S_{11}$ which is not paired is identically transmitted through a first Tx antenna and a second Tx antenna.

Figure 7:
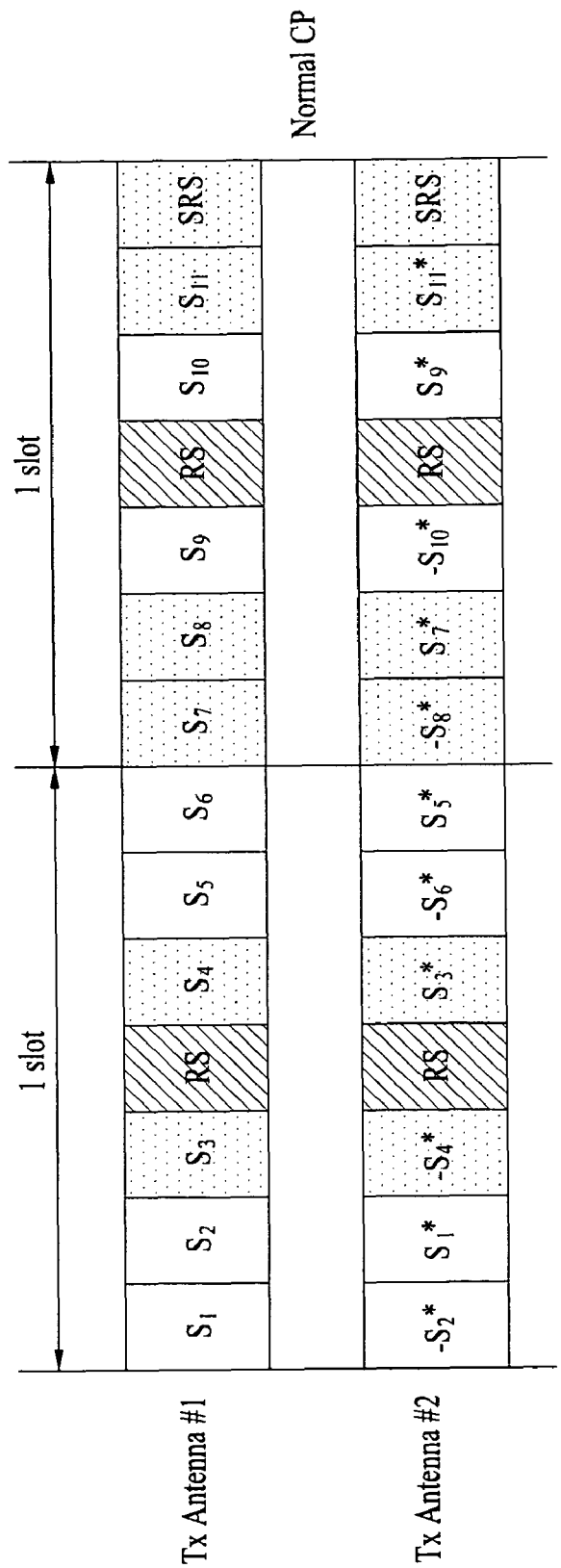
FIG. 7 illustrates a method for transmitting a symbol, which is not paired by an STBC scheme in a subframe in which an SRS is transmitted, through a second antenna in a conjugate form according to another exemplary embodiment of the present invention.

FIG. 7 illustrates a method for transmitting a symbol, which is not paired by an STBC scheme in a subframe in which an SRS is transmitted, through a second antenna in a conjugate form according to another exemplary embodiment of the present invention.

In the exemplary embodiment shown in FIG. 6, when transmitting 13 SC-FDMA symbols within one subframe due to transmission of the SRS, symbols transmitted through the second antenna, excluding the last one SC-FDMA symbol among the symbols $s_1$ to $s_{11}$ transmitted through the first antenna, are a conjugate form of the symbols transmitted through the first antenna. Another exemplary embodiment of the present invention proposes that even the last symbol $s_{11}$ which is not paired be transmitted in a complex form during transmission through the second antenna, as illustrated in FIG. 7.

The symbol which is not paired by an STBC scheme is not necessarily the last SC-FDMA symbol within a subframe. In some cases, the symbol which is not paired may be located around an RS so as to acquire a channel estimation gain.

Hereinafter, a signal transmission method in a two-antenna system using an extended CP will be described.

Figure 8:
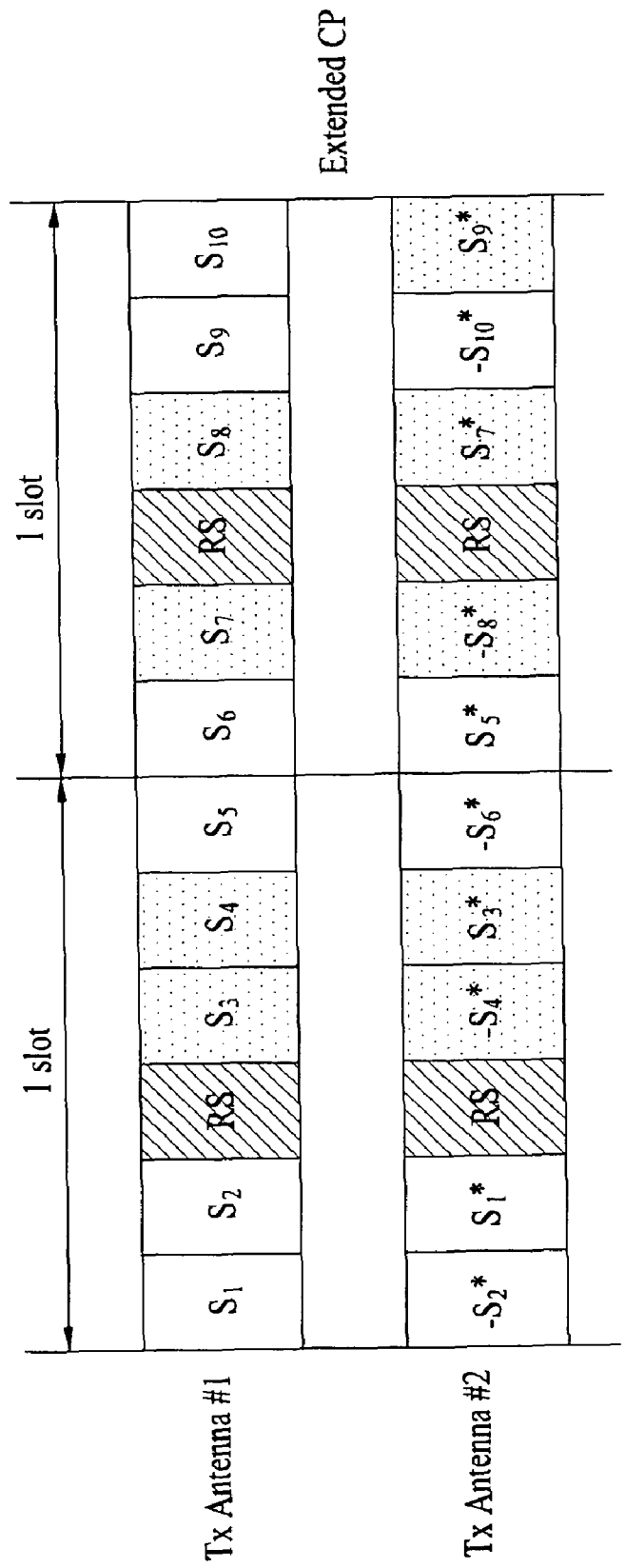
FIGS. 8 and 9 illustrate signal transmission methods by an STBC scheme in a two-antenna system using an extended CP.
Figure 9:
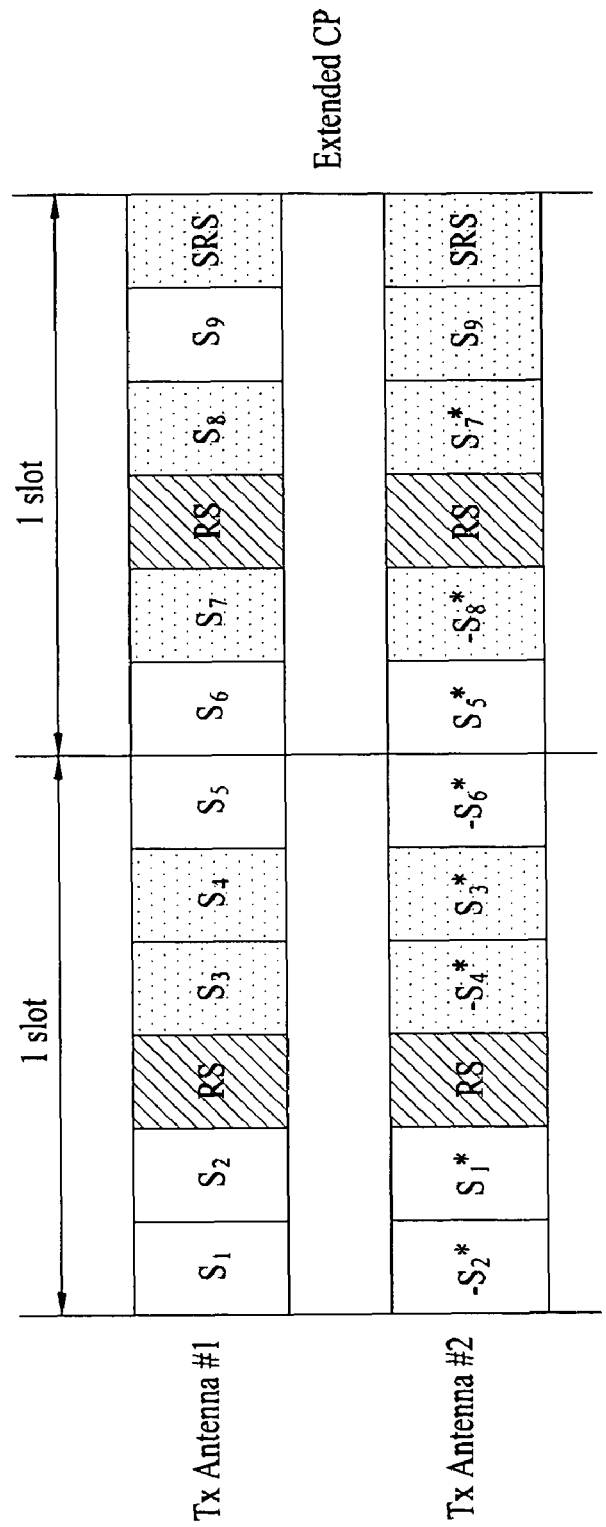

FIGS. 8 and 9 illustrate signal transmission methods by an STBC scheme in a two-antenna system using an extended CP.

Figure 12:
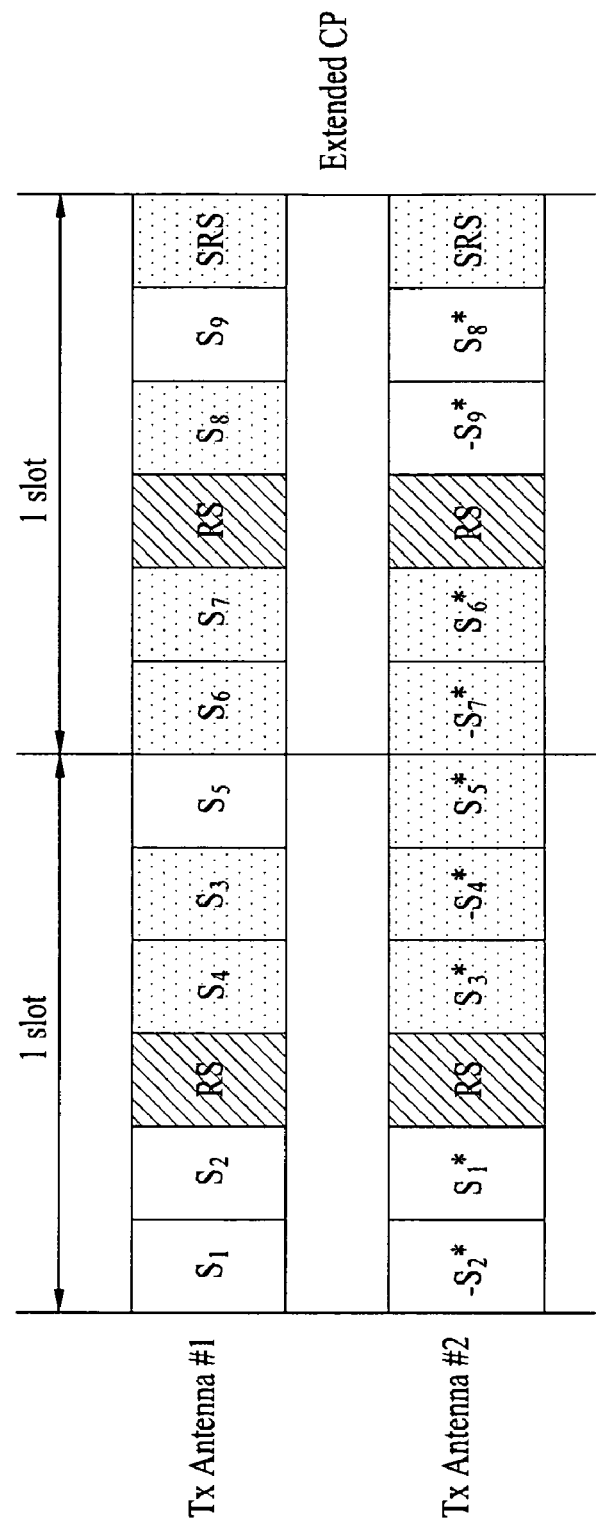

When using an extended CP as illustrated in FIGS. 8 and 9, 12 SC-FDMA symbols are present within one subframe and 6 SC-FDMA symbols are present per slot. As shown in FIG. 8, 10 symbols within the subframe, excluding one symbol per slot for transmission of an RS (i.e., two symbols within the subframe), are paired by an STBC scheme in units of two adjacent symbols. As shown in FIG. 9, 8 symbols among 9 symbols, excluding one symbol per slot for transmission of an RS (i.e., two symbols within the subframe) and one symbol within the subframe for transmission of an SRS, are paired by an STBC scheme in units of two adjacent symbols and the remaining one symbol is not paired. In FIG. 9, a symbol which is transmitted without being paired is $S_9$.

However, when sequentially performing STBC pairing two symbols by two symbols with respect to SC-FDMA symbols excluding an RS, an STBC pair may occur at a slot boundary. When considering the case where frequency hopping may be performed upon a transmission signal in units of slots or in units of subframes in a 3GPP series system, it is not desirable that an STBC pair occurs at a slot boundary.

Figure 10:
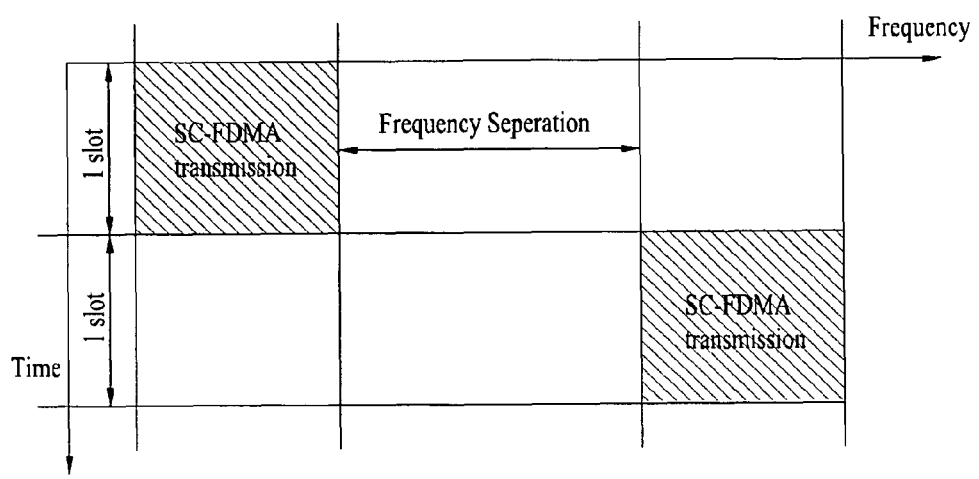
FIG. 10 illustrates an example of performing frequency hopping in units of slots.

FIG. 10 illustrates an example of performing frequency hopping in unit of slots.

As illustrated in FIG. 10, if a signal is transmitted through frequency hopping in units of slots, the STBC pairs generated throughout the slot boundary in FIGS. 8 and 9 are transmitted throughout different frequency regions. In this case, since channel coefficients of symbols within the STBC pairs become different, reception performance may be deteriorated.

In an exemplary embodiment of the present invention, a signal transmission method using an STBC scheme is proposed as follows.

Figure 11:
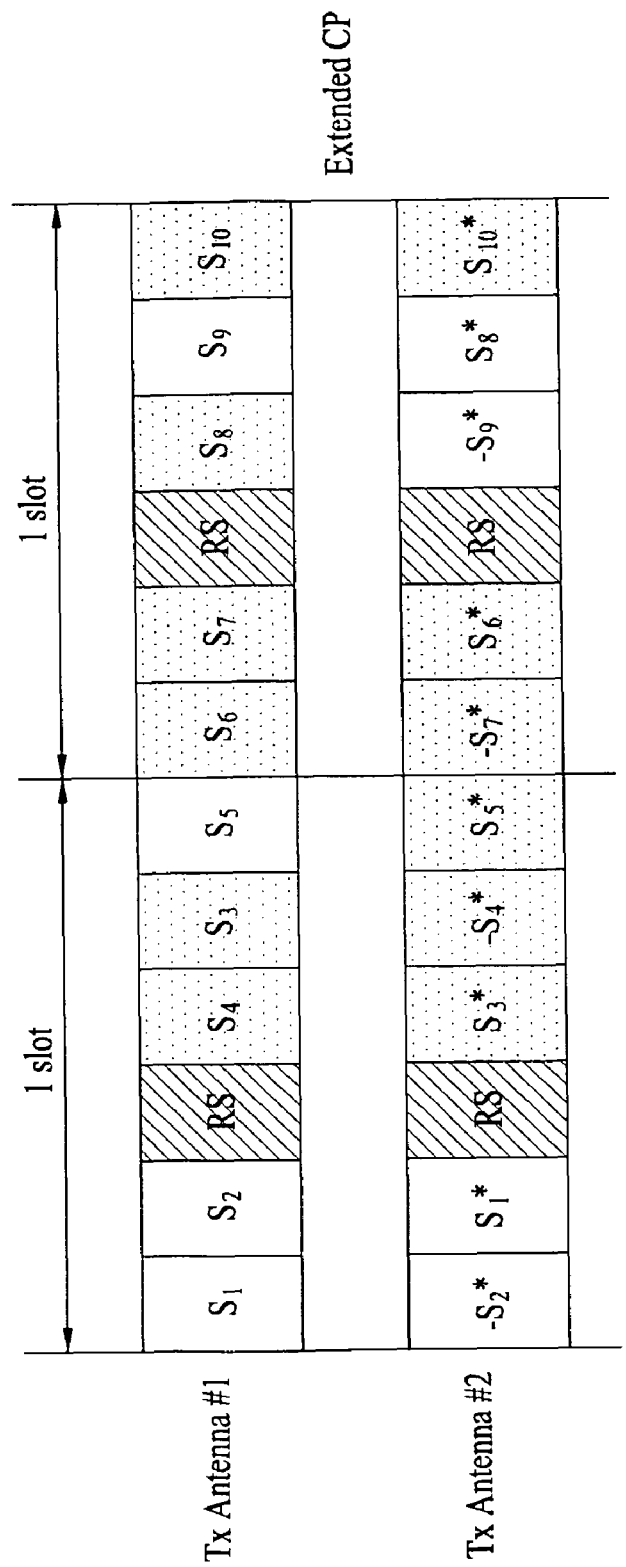
FIGS. 11 and 12 illustrate methods for transmitting signals using an STBC scheme when an extended CP is used according to an exemplary embodiment of the present invention.

FIGS. 11 and 12 illustrate signal transmission methods using an STBC scheme when an extended CP is used according to an exemplary embodiment of the present invention.

As illustrated in FIG. 11, the last SC-FDMA symbol of each slot is not paired so as not to generate an STBC pair at each SC-FDMA slot boundary. Meanwhile, in a subframe in which an SRS is transmitted as illustrated in FIG. 12, the SRS may be set to be transmitted through any one of symbols which are not paired in FIG. 11. Desirably, a symbol $S_5$ which is transmitted without being paired is located between transmitted RSs, thereby obtaining a channel estimation gain.

In an exemplary embodiment of the present invention, the methods shown in FIGS. 9 and 10 and the methods shown in FIGS. 11 and 12 may be flexibly combined. Namely, if frequency hopping is not performed in units of slots, STBC pairing may be performed even throughout a slot boundary as illustrated in FIGS. 9 and 10. If the frequency hopping is performed in units of slots, STBC pairing may not be performed upon one symbol when the number of symbols excluding symbols for transmission of an RS and an SRS is an odd number as illustrated in FIGS. 11 and 12.

Although the above-described transmission methods are suitable for transmission through a physical uplink shared channel (PUSCH), the same principle may be applied to transmission of other channel signals.

Figure 13:
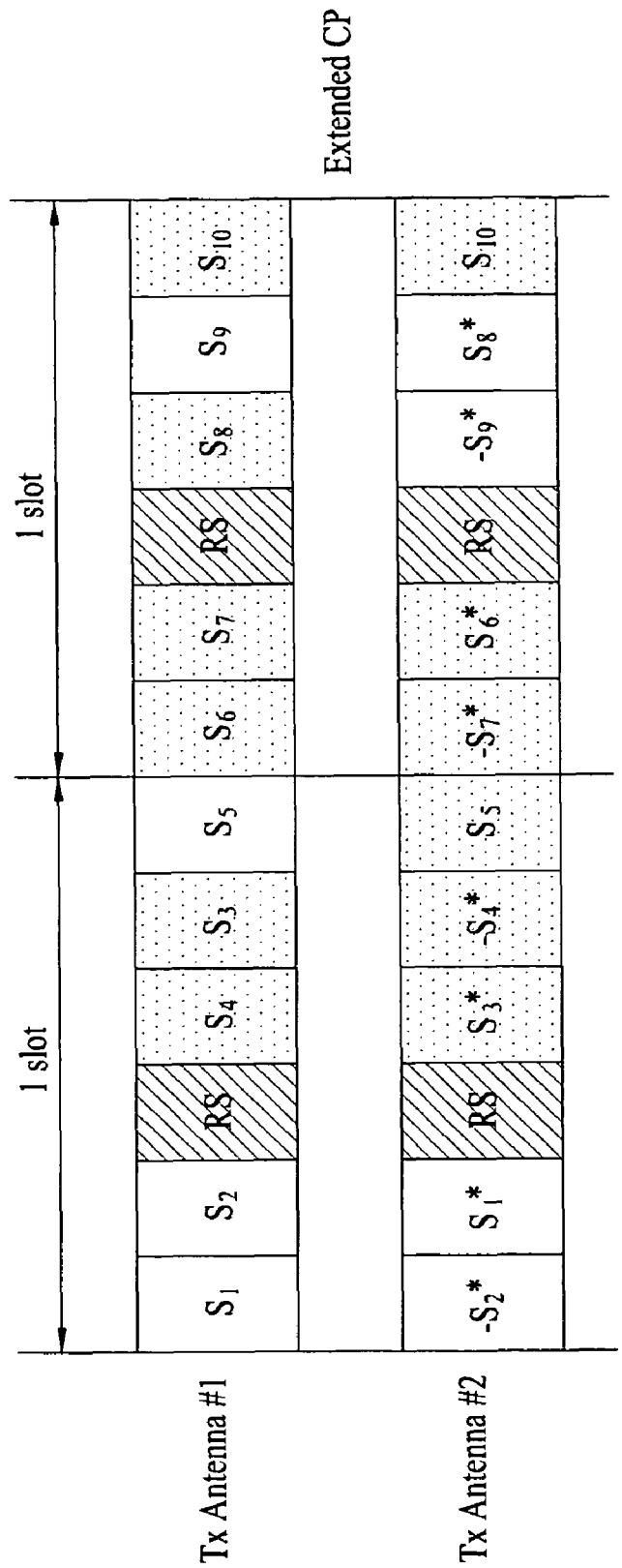
FIGS. 13 to 15 illustrate signal transmission methods in a two-antenna system using an expended CP according to other exemplary embodiments of the present invention.
Figure 14:
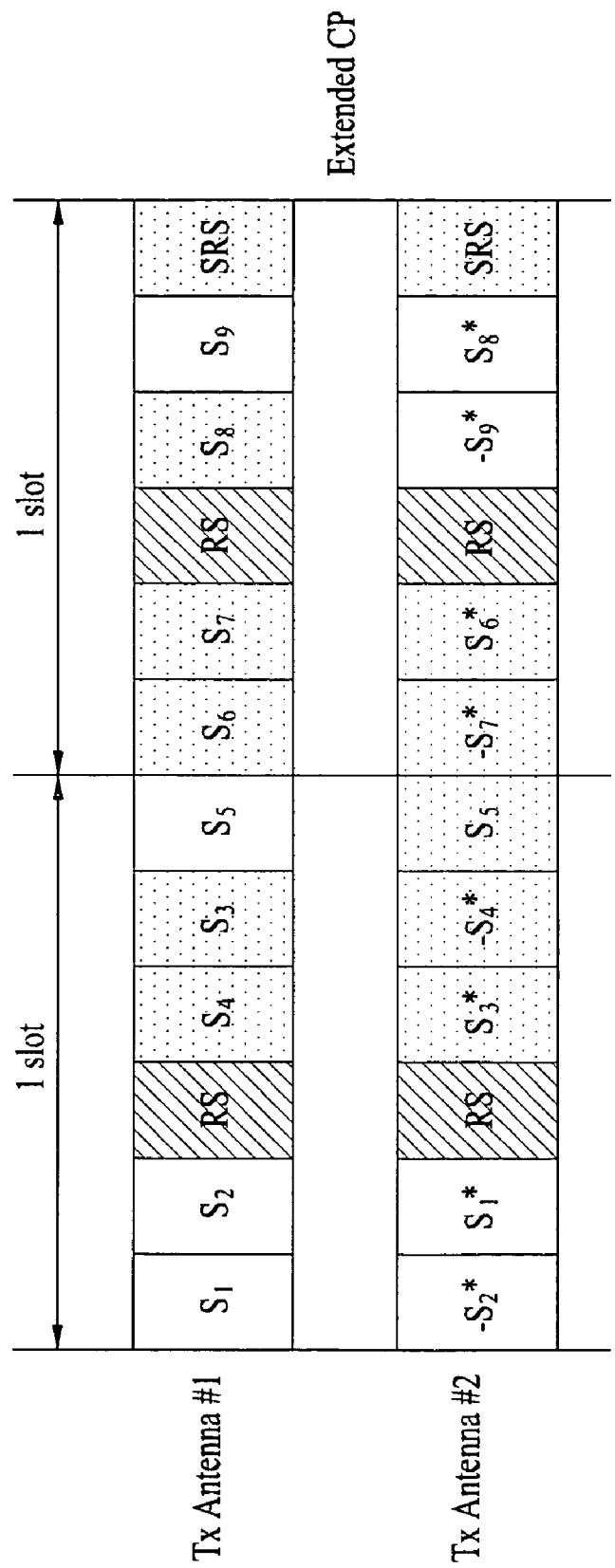
Figure 15:
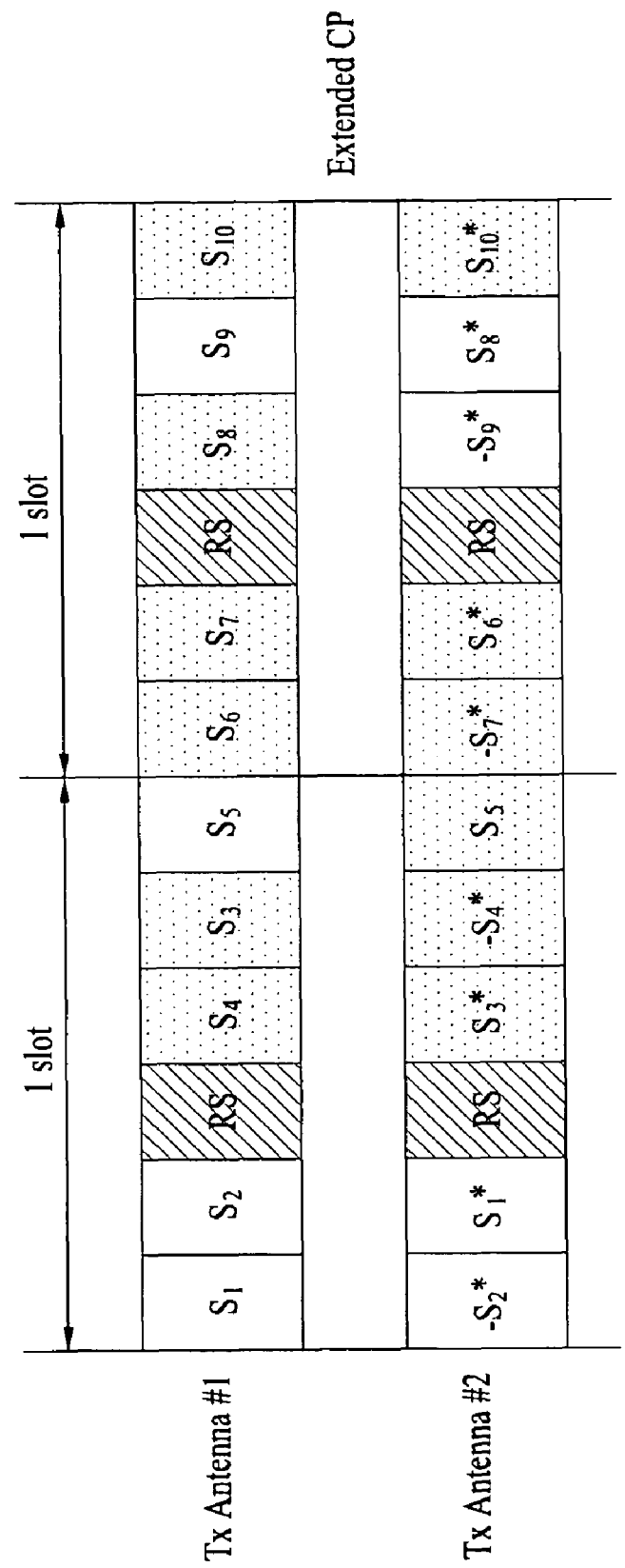

FIGS. 13 to 15 illustrate signal transmission methods in a two-antenna system using an expended CP according to other exemplary embodiments of the present invention.

In the exemplary embodiments shown in FIGS. 11 and 12, symbols transmitted through the second antenna are a conjugate form. However, as illustrated in FIGS. 13 and 14, symbols transmitted through the second antenna may be transmitted in the same form as symbols transmitted through a first antenna.

In a subframe in which an SRS is not transmitted in a two-antenna system using an extended CP as illustrated in FIG. 15, two symbols to which STBC pairing is not applied may be present. In this case, one symbol (e.g., $S_5$) may be transmitted in the same form through a first antenna and a second antenna, and another symbol (e.g., $S_{10}$) may be set such that a symbol transmitted through a second antenna is transmitted in a conjugate form of a symbol transmitted through a first antenna.

Hereinafter, a signal transmission method in a four-antenna system will be described.

A UE having four Tx antennas may transmit signals using four Tx diversity. The Alamouti code may be used in two Tx antennas but may not be extended to the four-antenna system as a general method.

According to an exemplary embodiment of the present invention, STBC is applied to groups of two antennas in the four-Tx system and frequency selective transmit diversity (FSTD) is applied between two pairs of Tx antennas.

Since it is important to maintain a CM value during transmission of a PUSCH, it is also important to maintain a low CM value even when FSTD is used. A method for acquiring a diversity gain while maintaining a low CM value is as follows.

Figure 16:
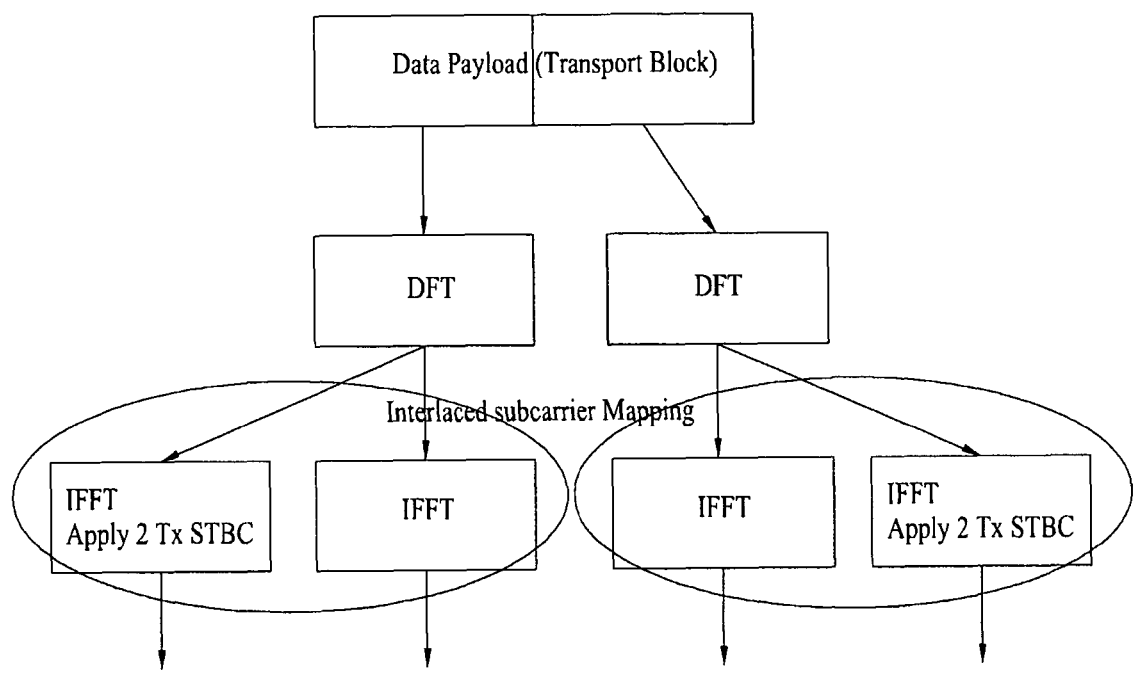
FIGS. 16 and 17 illustrate methods for acquiring a diversity gain while maintaining good CM characteristics in a four-antenna system according to an exemplary embodiment of the present invention.
Figure 17:
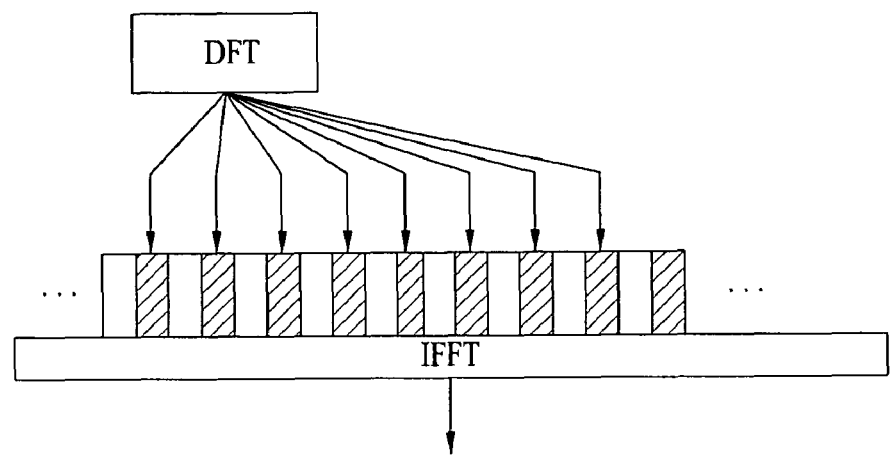
Figure 17:
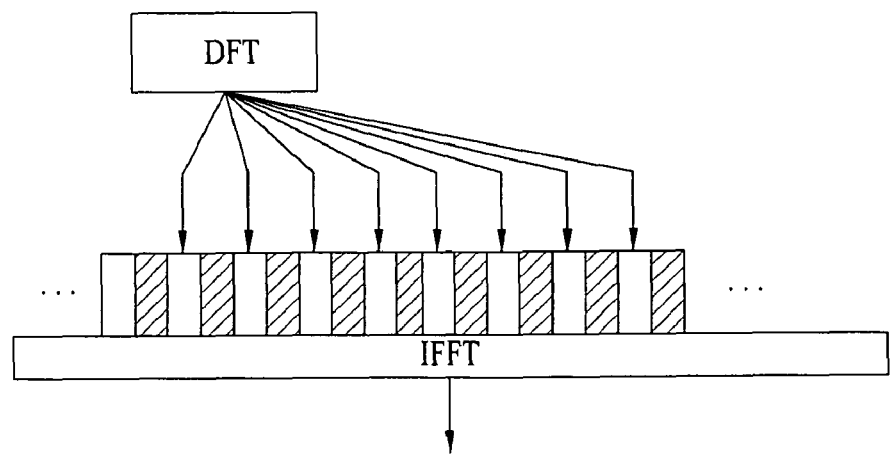

FIGS. 16 and 17 illustrate methods for acquiring a diversity gain while maintaining good CM characteristics in a four-antenna system according to an exemplary embodiment of the present invention.

Specifically, data symbols to be transmitted are classified into two groups and STBC applied in a two-Tx system may be used for each group. When mapping symbols per group to subcarriers through IFFT, it is proposed that symbols transmitted per antenna be arranged in an interlaced structure.

For example, it is assumed that first and second antennas are one group and third and fourth antennas are another group.

Then the above-mentioned STBC scheme is applied to the first and second antennas. When mapping symbols to subcarriers per antenna, data symbols are mapped only to odd-numbered subcarriers within a data transmission width in the first and second antennas, and 0s are filled to even-numbered subcarriers. Meanwhile, the STBC scheme is applied to the third and fourth antennas, and a signal may be transmitted such that 0s are filled to even-numbered subcarriers and data symbols are mapped to even-numbered subcarriers. In this case, information transmitted to the first and second antennas and information transmitted to the third and fourth antennas may be set to be different data which is simultaneously encoded and transmitted.

As described above, the present invention can efficiently achieve transmit diversity while maintaining good CM characteristics. The embodiments of the present invention are applicable to a 3GPP-series system, especially to a 3GPP LTE-A system. In some case, however, the same principle may be applied to other wireless communication systems using the same subframe structure.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims.

Accordingly, the invention should not be limited to the specific embodiments described herein, but should be accorded the broadest scope consistent with the principles and novel features disclosed herein.

What is claimed is:

1. A method for transmitting a signal using two or more transmission antennas in a mobile communication system using a structure in which one subframe includes two slots and each slot includes a plurality of symbols, the method comprising:
    pairing transmission symbols in units of two consecutive symbols within each subframe by a space-time block coding (STBC) scheme; and
    mapping the transmission symbols to a frequency region in units of slots and transmitting the mapped transmission symbols;
    wherein one symbol within a slot is not paired by the STBC scheme when the number of symbols in the slot excluding symbols for transmitting a reference signal is an odd number.

2. The method according to claim 1, wherein, if transmission symbols are transmitted through the one symbol which is not paired by the STBC scheme, a specific symbol is transmitted through a first antenna and a symbol in a conjugate form of the specific symbol is transmitted through a second antenna.

3. The method according to claim 1, wherein, if the transmission symbols are transmitted through the one symbol which is not paired by the STBC scheme, the same symbol is transmitted through first and second antennas.

4. The method according to claim 1, wherein the mapping of the transmission symbols to the frequency region includes performing frequency hopping in units of slots.

5. The method according to claim 1, wherein each slot includes 6 symbols and one symbol per slot is previously assigned for transmission of a first type reference signal, when the mobile communication system transmits a signal using an extended cyclic prefix of a 3rd generation partnership project (GPP) series system.

6. The method according to claim 5, further comprising:
additionally transmitting a second type reference signal through one symbol within a specific slot,
wherein the second type reference signal is transmitted through a symbol corresponding to one symbol, which is not paired by the STBC scheme in a slot excluding the specific slot, among symbols within the specific slot.

7. The method according to claim 6, wherein the one symbol transmitting the second type reference signal is located between symbols transmitting the first type reference signal within one subframe.

8. The method according to claim 1, wherein each slot includes 6 symbols,
wherein the paring step includes:
pairing transmission symbols mapped to 4 symbols excluding one symbol for transmitting a data modulation reference signal within a first type slot in which a sounding reference signal is transmitted through one symbol, in units of two consecutive symbols by the STBC scheme;
pairing 4 symbols among transmission symbols mapped to 5 symbols excluding one symbol for transmitting the data modulation reference signal within a second type slot in which the sounding reference signal is not transmitted, in units of two consecutive symbols by the STBC scheme.

9. The method according to claim 8, wherein one specific subframe includes the first type slot and the second type slot, and transmission symbols which are not paired by the STBC scheme within the second type slot are located between symbols for transmitting the data modulation reference signal within the subframe.

* * * * *